UNITED STATES PATENT OFFICE.

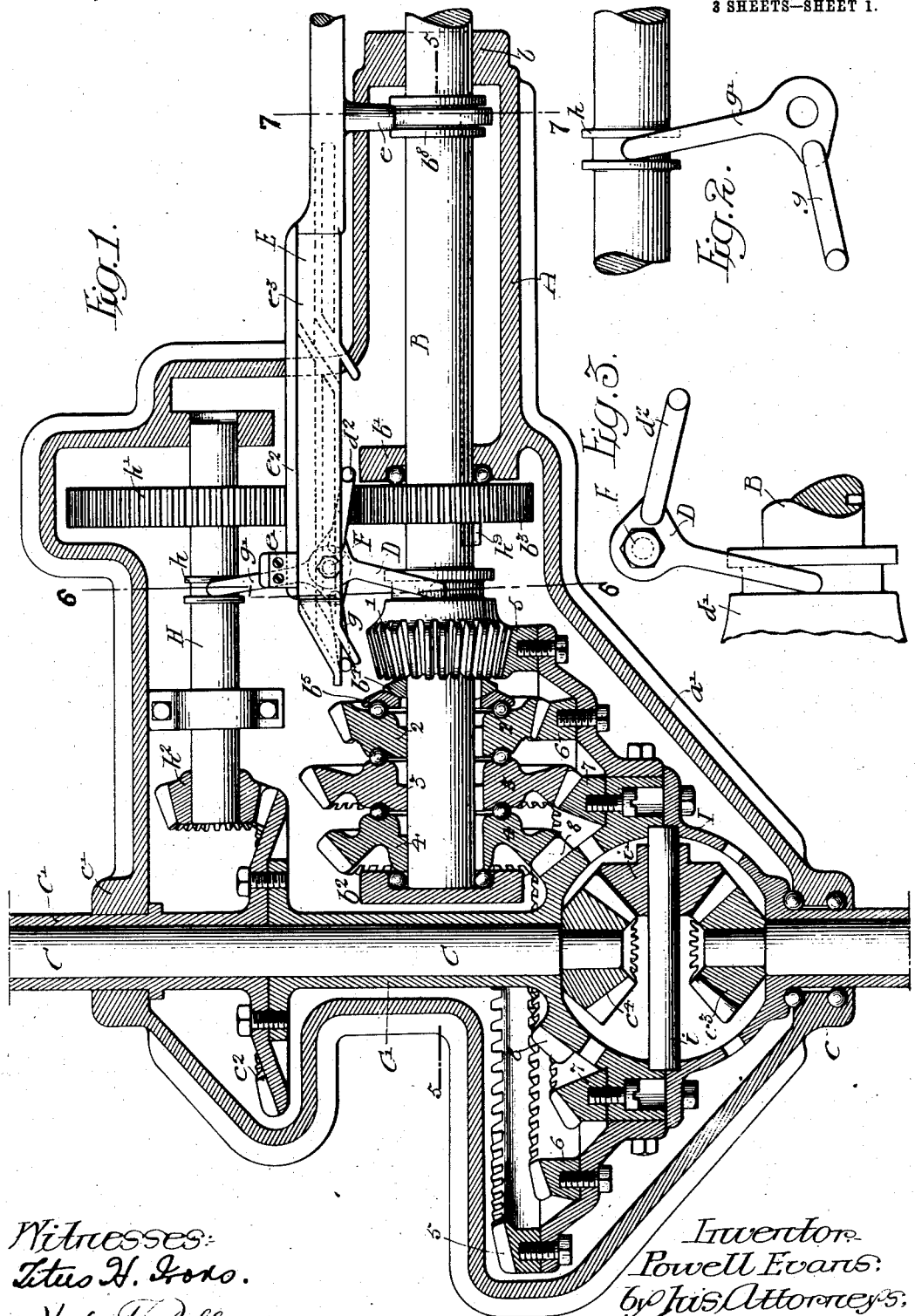

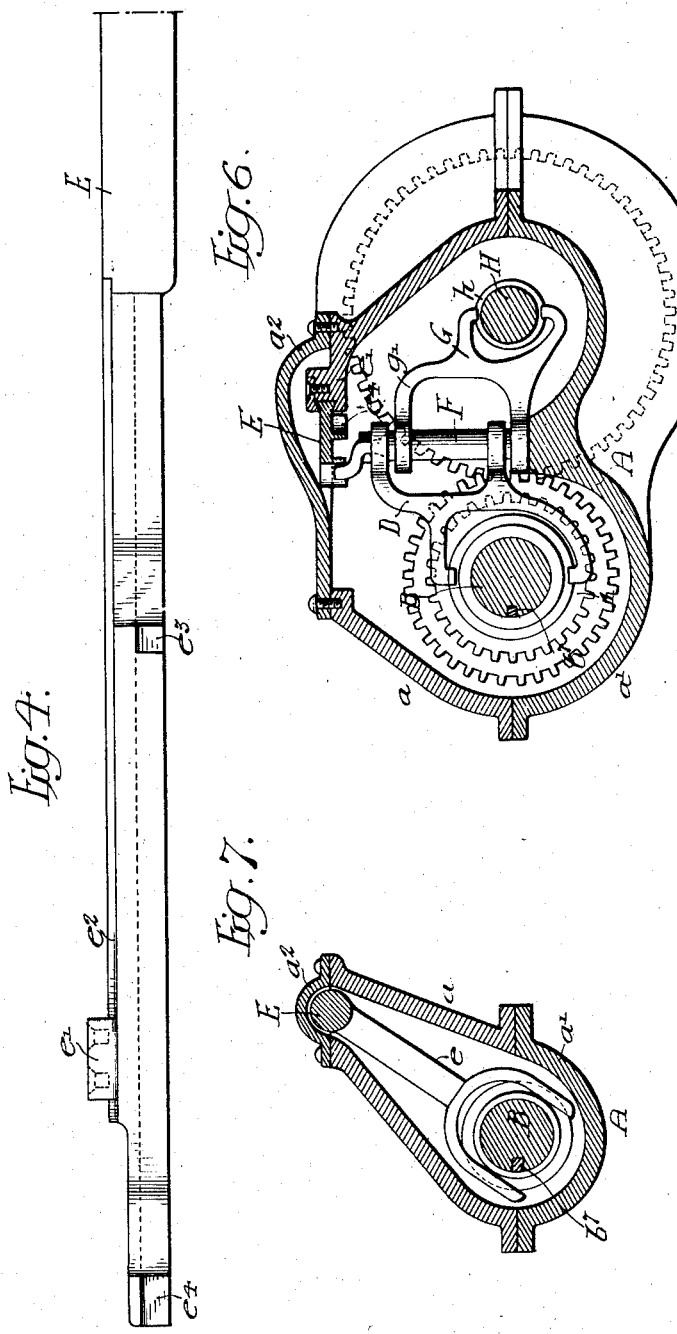

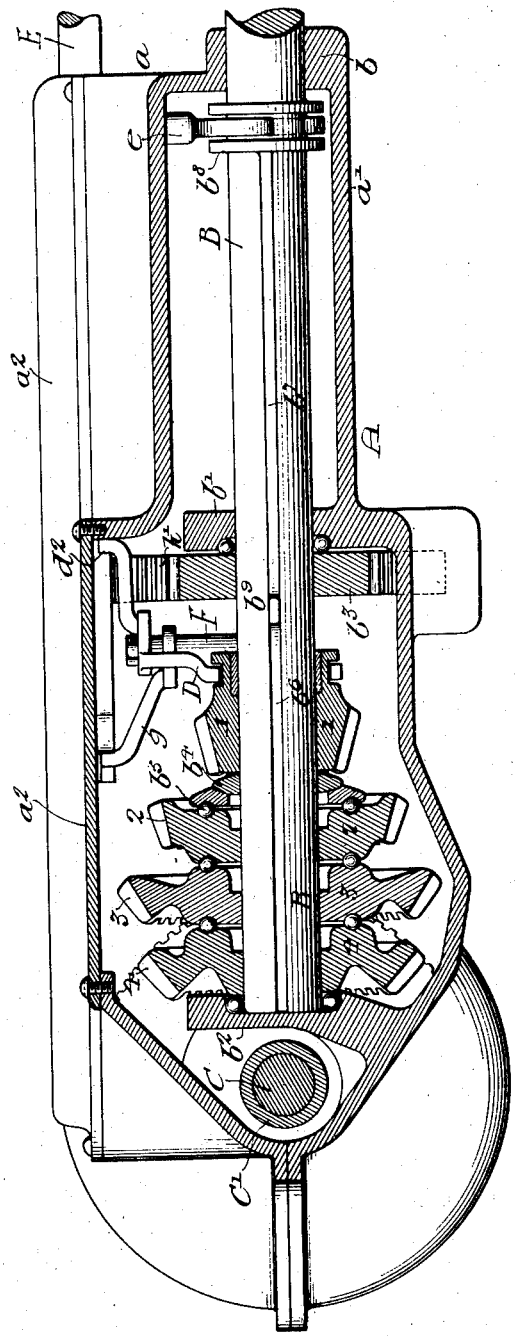
P. EVANS.
TRANSMISSION GEAR.
APPLICATION FILED NOV. 17, 1905. RENEWED JUNE 30, 1908.
905,677.
Patented Dec. 1, 1908.
3 SHEETS—SHEET 3.

POWELL EVANS, OF PHILADELPHIA, PENNSYLVANIA.

TRANSMISSION-GEAR.

No. 905,677.　　　Specification of Letters Patent.　　　Patented Dec. 1, 1908.

Application filed November 17, 1905, Serial No. 287,910. Renewed June 30, 1908. Serial No. 441,243.

*To all whom it may concern:*

Be it known that I, POWELL EVANS, a citizen of the United States, residing in Philadelphia, Pennsylvania, have invented a Transmission-Gear, of which the following is a specification.

One object of my invention is to provide a relatively simple and at the same time efficient transmission gear particularly designed to operatively connect an engine or other driving shaft with a shaft to be driven which extends in a line at right angles to said driving shaft.

A further object of my invention is to provide a transmission gear having the above characteristics, by which it shall be possible to operate a driven shaft at any desired one of a number of speeds in one direction or at a single speed in an opposite direction, from a single driven shaft always turning in the same direction; the device contemplating moreover means whereby certain of the gears connected to the driving shaft may be thrown out of mesh with gears on the driven shaft, preferably by means of mechanism operated simultaneously with the act of changing from one speed to another.

Another object of my invention is to provide a transmission gear for connecting a driving with a driven shaft at right angles thereto which shall require but a single set of gears on each of said shafts, which gears directly mesh with one another.

These objects I attain as hereinafter set forth, reference being had to the accompanying drawings, in which:—

Figure 1, is a horizontal section showing the detail construction and the arrangement of parts of my improved transmission gear; Figs. 2, 3 and 4, are side elevations of various details of the device; Fig. 5, is a vertical section of the mechanism shown in Fig. 1, taken on the line 5—5 of said figure, and Figs. 6 and 7, are vertical sections taken respectively on the lines 6—6 and 7—7 of Fig. 1.

Referring to the above drawings, A represents a casing of suitable form completely inclosing the apparatus hereafter described and said casing is made in two parts, an upper $a$ and a lower $a'$, held together by suitable means and provided with a removable cover $a^2$, by which access to its interior may be had for the purpose of inspection, etc. Extending into the casing A from one end of the same is a shaft B, which I shall hereafter refer to as the engine-shaft, and this is supported in bearings $b$, $b^2$ and $b'$, respectively at the ends of the casing and about the middle, the two latter being preferably ball bearings.

Extending at right angles to the engine-shaft B is a shaft C to be driven and it will be seen that this operates within a tubular shaft $C'$ carried in bearings $c$ and $c'$ in case A. Upon the engine-shaft B is keyed a pinion $b^3$, with one face of which the balls of the bearing $b'$ preferably engage. A collar $b^4$, preferably formed integral with the shaft B, has on one side of it a ring $b^5$ and between this and the balls of the bearing $b^2$ are confined three beveled gears loose on the shaft B, respectively indicated by the numerals 2, 3 and 4; these gears having in the present instance ball bearings between their adjacent faces. If desired, however, said gears may have between them collars fastened to shaft B, so that there is no transmission of pressure from one to another. Also loosely carried by said shaft, but upon the opposite side of the collar $b^4$, is a fourth beveled gear, indicated by the numeral 1, which is not only free to turn independently of the shaft B, but is also free to move longitudinally thereon under the action of a lever D, which is forked to engage a suitable groove formed in an extension of said gear 1, as shown in Fig. 6.

The shaft B is provided with a key-way $b^6$ in which slides a key or spline $b^7$, whereby any one of the gears 1, 2, 3 or 4, may at will be operatively connected to and driven by said shaft according to the position of said spline. In order to move the spline I fix to it a grooved collar $b^8$, with which engages the forked end of an arm $e$ rigidly attached to a longitudinally movable bar E extending through an opening in the casing A and guided by means of a supporting structure $e'$ having an undercut groove for the reception of a rib $e^2$ on said bar E, as plainly shown in Fig. 1.

Attached to and movable with the bar E is a cam guide piece having two grooves $e^3$ and $e^4$, of which one is designed to engage with the suitably formed end of an arm $d^2$ belonging to a lever D carried upon a pin F suitably supported from the casing A, as shown in Fig. 6. The groove $e^4$ of the cam piece is designed to engage the end of an arm $g$ of a lever G, whose second arm $g'$ engages a collar $h$ fixed on a shaft H supported in suitable bearings in the casing A, and extending in a line parallel to the engine-shaft B. Said shaft H has fixed to it a gear $h'$ meshing with the gear $b^3$ of the shaft B, and also carries a beveled gear $h^2$ capable of meshing with a beveled gear $c^2$ permanently fixed to the tubular shaft $C'$. Moreover, this shaft H is capable of being moved longitudinally, under the action of the lever G, so as to throw both the gear $h'$ and the gear $h^2$ out of engagement with the gears $b^3$ and $c^2$ respectively.

From Fig. 1, it will be seen that the tubular shaft $C'$ carries, or has fixed to it, what may be described as a structure supporting a series of beveled gears or annular beveled racks, there being also a hub portion I through which extends the driven shaft C. Said hub portion is hollow and contains an auxiliary spindle $i$ supported in suitable bearings and provided with a beveled pinion $i'$ meshing with similar beveled pinions $c^3$ and $c^4$, respectively fixed to the adjacent ends of the two parts of the driven shaft C in such manner as to form the well known compensating or differential mechanism. To this hollow hub structure I are secured the four circular beveled racks 5, 6, 7 and 8, respectively meshing with the beveled gears 1, 2, 3 and 4 on the shaft B.

With this arrangement of parts in the relative positions shown in Fig. 1, the turning of the engine-shaft B drives the gear $h'$ from the pinion $b^3$ and thereby turns the shaft H, pinion $h^2$, beveled gear $c^2$, and tubular shaft $C'$ in a direction the reverse of what is its normal direction. If, now, the rod E be moved into the case by any of the various forms of operating devices known to this art, the arm $g$ is at once engaged by the cam groove $e^4$ of the cam piece on said rod in such manner as to swing the lever G and cause it to move shaft H longitudinally through a distance sufficient to first disengage gears $h^2$ and $c^2$ and afterwards throw gear $h'$ out of mesh with pinion $b^3$. A further movement of the rod E in the same direction moves the collar $b^8$, and consequently the spline $b^7$, through a distance sufficient to cause said spline to operatively couple the beveled gear 1 with the shaft B, so that this gear, which meshes with the beveled annular rack 5, turns the latter with the hub portion I and the tubular shaft $C'$ in a forward direction, also turning the two parts of the shaft C in a corresponding direction through the medium of the differential gear. Said driven shaft C is therefore given its lowest forward speed. Another movement of the rod E in the same direction as formerly, moves the end $b^9$ of the spline $b^7$ out of engagement with the key-way of gear 1, after which said gear is moved longitudinally upon the shaft B out of mesh with the annular rack 5 by reason of the action of the arm $d$ of lever D, which is turned on its pivot by the action of the cam groove $e^3$ upon the end of the arm $d^2$ of said lever. Immediately thereafter the end $b^9$ of the spline operatively couples beveled gear 2 with the shaft B, so that the tubular shaft $C'$ is driven through the annular rack 6, at a higher speed than previously. Further, inward movements of the rod E successively connect beveled gears 3 and 4 with the shaft B and so further speeds up tubular shaft $C'$ and consequently the driven shaft C. Moving the rod E outwardly of the case performs the above noted operations in a reverse order to that described.

It will be seen that by this arrangement of parts one of the forward driving gears is thrown out of mesh with its annular rack of the tubular shaft $C'$ is operating at any of the three higher speeds, in addition to which all of the reverse gearing is absolutely idle except at such times as it is actually in use. It will be further noted that the efficiency of my improved combination is relatively high, by reason of the fact that the power is transmitted directly from the driving to the driven shaft on the forward speeds. By these means I avoid the very serious efficiency losses as well as the increased weight and expense always found when an intermediate shaft, with its gearing, is employed to connect two shafts.

I claim as my invention:

1. A transmission gear consisting of two shafts extending in lines at right angles to each other, a series of beveled gears fixed to one shaft, a second series of beveled gears on the other shaft and respectively meshing with the gears of the first shaft, means for operatively connecting at will any one of said gears to its shaft to change the relative speed of the other shaft, with reverse gearing capable of being made to connect said two shafts, and means for throwing out of mesh the members of said reverse gearing when they are out of use, substantially as described.

2. A transmission gear consisting of two shafts extending in lines at right angles to each other, a third shaft substantially parallel to one of the shafts, a series of beveled gears fixed to one shaft, a second series of beveled gears on another shaft and respectively meshing with the gears of the first shaft, means for operatively connecting at will any one of said gears to its shaft to change the relative speed of the other shaft, beveled gearing capable of connecting the first and third shafts, plane gears capable of connecting the second and third shafts, and means for moving the third shaft to operatively disconnect it from both the other shafts when said third shaft is not required to transmit power, substantially as described.

3. A transmission gear consisting of two shafts extending in lines at right angles to each other, a series of beveled gears fixed to one shaft, a second series of beveled gears loose on the other shaft and respectively meshing with the gears of the first shaft, means for operatively connecting at will any one of said loose gears to its shaft to change the relative speed of the other shaft, the first of said loose gears being longitudinally slidable on its shaft and being provided with mechanism for moving it at will to an extent sufficient to free it from engagement with its corresponding gear on the other shaft, substantially as described.

4. A transmission gear consisting of two shafts extending in lines at right angles to each other, a series of beveled gears fixed on one shaft, a second series of beveled gears loose on the other shaft and respectively meshing with the gears of the first shaft, means including a sliding key and a rod for moving said key for operatively connecting at will any one of the loose gears to its shaft, with reverse gearing capable of being made to connect said two shafts, and operatively connected with said loose gear connecting means, substantially as described.

5. A transmission gear consisting of two shafts extending in lines at right angles to each other, a series of beveled gears fixed on one shaft, a second series of beveled gears loose on the other shaft and respectively meshing with the gears of the first shaft, means for operatively connecting at will any one of said loose gears to its shaft, and means for throwing a loose gear out of mesh with its corresponding gear on the other shaft when another loose gear is operatively connected to its shaft, substantially as described.

6. A transmission gear consisting of two shafts extending in lines at right angles to each other, a series of beveled gears fixed on one shaft, a second series of beveled gears loose on the other shaft and respectively meshing with the gears of the first shaft, means for operatively connecting at will any one of said loose gears to its shaft, with an operating bar whereby a loose gear may be moved longitudinally upon its shaft out of mesh with its corresponding beveled gear, said bar being operatively connected to the means for connecting the loose gears to their shaft, substantially as described.

7. A transmission gear consisting of two shafts at right angles to each other, two sets of gears on said shafts respectively meshing with each other, means for operatively connecting any one of the gears of one set to its supporting shaft, a third shaft geared to said latter shaft and extending parallel thereto, beveled gearing connecting said third shaft to the shaft at right angles to it, means for longitudinally moving the third shaft to disconnect it from the shaft parallel to it, and a device common to said disconnecting means and to the means for connecting the beveled gears to their shaft, for actuating both of said means, substantially as described.

8. A transmission gear consisting of two shafts at right angles to each other, a series of beveled gears fixed on one shaft, a second series of beveled gears loose on the other shaft and respectively meshing with the gears of the first shaft, a key for operatively connecting at will any one of said loose gears to its shaft, a reversing gear including a third shaft parallel to the key shaft and supported so as to be movable longitudinally, two gears on the third shaft, and a gear on the key shaft meshing with one of said gears, with means common to the key and to the reversing gear for operating both of the same, substantially as described.

9. The combination of a driving and a driven shaft, a series of beveled gears on the driven shaft, a second series of beveled gears loose on the driving shaft, a key for connecting any one of said latter gears to said driving shaft, a lever for moving a loose gear on its shaft, means for shifting the position of said lever, and a bar operatively connected both to the key and to said lever-shifting means for operating both of the same, substantially as described.

10. The combination of a driving, a driven and a reverse shaft, a series of beveled gears on the driven shaft, a second series of beveled gears loose on the driving shaft, a key for connecting any of said latter gears to said driving shaft, gears respectively on the driving and on the reverse shafts, means including a lever for moving said latter gears into and out of mesh, means for moving said lever, and a bar operatively connected both to the key and to said means for moving both of the same, substantially as described.

11. The combination of a driving, a driven and a reverse shaft, a series of beveled gears on the driven shaft, a second series of beveled gears loose on the driving shaft, a key for connecting any one of said latter gears to said driving shaft, gears respectively on the driving and on the reverse shafts, means including a lever for moving said latter gears into and out of mesh, a cam for moving said lever, and a bar operatively connected both to the key and to said cam for moving both of the same, substantially as described.

12. The combination of driving and driven shafts supported at right angles to each other, with a reverse shaft, gears directly connecting the driving and the driven shafts, other gears connecting said two shafts through the reverse shaft, with means including arms, and a rod having cams for moving said arms for first operatively disconnecting the reverse shaft from the driving shaft, then directly connecting the driving with the driven shaft for any one of a plurality of forward speeds, substantially as described.

13. The combination of driving and driven shafts supported at right angles to each other, with a reverse shaft, gears directly connecting the driving and the driven shafts, other gears connecting said two shafts through the reverse shaft, with means for first operatively disconnecting the reverse shaft from the driving shaft, then directly connecting the driving with the driven shaft for a relatively low speed, then throwing the slow speed gears out of mesh and afterward directly connecting said two shafts for higher speeds, said means having a single operating bar, substantially as described.

In testimony whereof, I have signed my name to this specification, in the presence of two subscribing witnesses.

POWELL EVANS.

Witnesses:
CHARLES C. NORRIS, Jr.,
WILLIAM E. BRADLEY.